United States Patent
Miranda et al.

(10) Patent No.: US 10,873,860 B2
(45) Date of Patent: Dec. 22, 2020

(54) SYSTEM AND METHOD FOR REAL TIME FRAUD ANALYSIS OF COMMUNICATIONS DATA

(71) Applicant: TATA COMMUNICATIONS (AMERICA) INC., Herndon, VA (US)

(72) Inventors: Carlos Miranda, Deerfield Beach, FL (US); Manish Arora, Edison, NJ (US); Kumar Thirumalaiappan, Edison, NJ (US); Brian Dowd, Beachwood, NJ (US)

(73) Assignee: TATA COMMUNICATIONS (AMERICA) INC., Herndon, VA (US)

( * ) Notice: Subject to any disclaimer, the term of this patent is extended or adjusted under 35 U.S.C. 154(b) by 0 days.

(21) Appl. No.: 16/677,447

(22) Filed: Nov. 7, 2019

(65) Prior Publication Data
US 2020/0077271 A1 Mar. 5, 2020

Related U.S. Application Data

(63) Continuation of application No. 16/090,720, filed as application No. PCT/US2017/026799 on Apr. 10, 2017, now Pat. No. 10,548,016.
(Continued)

(51) Int. Cl.
*H04W 12/12* (2009.01)
*H04L 29/06* (2006.01)
(Continued)

(52) U.S. Cl.
CPC ............ *H04W 12/12* (2013.01); *G06F 21/50* (2013.01); *H04L 63/101* (2013.01);
(Continued)

(58) Field of Classification Search
CPC ...... G06F 21/10; G06F 21/121; G06F 21/313; G06F 21/50; H04L 51/30; H04L 63/101;
(Continued)

(56) References Cited

U.S. PATENT DOCUMENTS 8,194,581 B1 6/2012 Schroeder et al.
9,060,057 B1 6/2015 Danis
(Continued)

OTHER PUBLICATIONS

International Search Report and Written Opinion dated Aug. 23, 2017, International Application No. PCT/US2017/026799, pp. 1-10.
(Continued)

*Primary Examiner* — Harry S Hong
(74) *Attorney, Agent, or Firm* — Resolute Legal PLLC (57) ABSTRACT

A telecommunications service provider's real time analysis system analyzes communications data to detect potentially fraudulent communications data, where the analysis is performed in real time in the routing path of the communications data. The communications data may include calls (e.g., SS7, VoIP, etc. based calls) and messages (e.g., SMS, MMS, etc.). The real time analysis system rejects potentially fraudulent communications data and non-fraudulent communications data in order to be used in real time in the routing path of the communications data. A rejection by the real time analysis system may cause non-fraudulent communications data to still be sent to the intended destination of the communications data. The real time analysis system can be in the routing path of the communications data without further routing non-fraudulent communications data traffic to the next appropriate hop in the routing path.

12 Claims, 7 Drawing Sheets

Related U.S. Application Data (60) Provisional application No. 62/320,627, filed on Apr. 11, 2016.

(51) Int. Cl.
| | | |
|---|---|---|
| *H04M 1/663* | (2006.01) | |
| *H04M 3/42* | (2006.01) | |
| *H04M 3/436* | (2006.01) | |
| *H04M 7/00* | (2006.01) | |
| *H04W 4/14* | (2009.01) | |
| *G06F 21/50* | (2013.01) | |

(52) U.S. Cl.
CPC ...... *H04L 63/1408* (2013.01); *H04L 63/1441* (2013.01); *H04M 1/663* (2013.01); *H04M 3/42059* (2013.01); *H04M 3/42102* (2013.01); *H04M 3/436* (2013.01); *H04M 7/0078* (2013.01); *H04W 4/14* (2013.01); *H04M 2203/6027* (2013.01)

(58) Field of Classification Search
CPC ............ H04L 63/1408; H04L 63/1441; H04M 1/663; H04M 3/42059; H04M 3/42102; H04M 3/436; H04M 7/0078; H04M 2203/6027; H04W 4/06; H04W 4/14; H04W 12/02; H04W 12/12
USPC ........................................ 379/210.02, 210.03
See application file for complete search history.

(56) References Cited

U.S. PATENT DOCUMENTS

| | | | |
|---|---|---|---|
| 10,548,016 B2 * | 1/2020 | Miranda | .............. H04W 4/24 |
| 2005/0278620 A1 | 12/2005 | Baldwin et al. | |
| 2006/0031314 A1 | 2/2006 | Brahms et al. | |
| 2007/0143422 A1 | 6/2007 | Cai | |
| 2014/0031009 A1 | 1/2014 | Vendrow et al. | |
| 2019/0124516 A1 * | 4/2019 | Miranda | .............. H04M 15/59 |

OTHER PUBLICATIONS

Extended European Search Report dated Oct. 23, 2019, European Application No. 177829165, pp. 1-7.
Search Report and Written Opinion, Singapore Application No. 11201808725V, dated Feb. 24, 2020, pp. 1-10.

* cited by examiner

SYSTEM AND METHOD FOR REAL TIME FRAUD ANALYSIS OF COMMUNICATIONS DATA

This application is a continuation of U.S. application Ser. No. 16/090,720, filed on Oct. 2, 2018, which is a National Stage of International Application No. PCT/US2017/026799, filed on Apr. 10, 2017, which claims priority to U.S. Provisional Application No. 62/320,627, filed on Apr. 11, 2016. The contents of the above documents are incorporated herein by reference in their entirety.

FIELD OF THE INVENTION

Summary of the Invention

In accordance with the present disclosure, a real time analysis system analyzes communications data to detect and block fraudulent communications. The real time analysis system may automatically block fraudulent communication data and non-fraudulent communications data in real time. For example, the real time analysis system may automatically generate and transmit blocking messages for fraudulent communications and non-fraudulent communications during a communications initiation or set up process.

In accordance with one embodiment, the real time analysis system analyzes calls for fraud in real time. A telecommunications service provider's real time analysis system analyzes call termination requests and detects potentially fraudulent calls. The real time analysis system may automatically block potentially fraudulent calls and non-fraudulent calls in real time. For example, the real time analysis system may automatically block potentially fraudulent calls and non-fraudulent calls during a call initiation or set up process.

In one embodiment, the real time analysis system enables efficient correction of false positives. A false positive is a call that was incorrectly identified as potentially fraudulent and blocked, but in reality should not have been blocked. The real time analysis system enables false positives to be identified and corrected such that the real time analysis system does not continue to inappropriately block such a call in the future, as well as calls with similar attributes in the future.

In one embodiment, the telecommunications service provider's network and equipment is not within the natural call termination path for an analyzed call (e.g., the telecommunications service provider's network and equipment would not normally be used to route a call to its final destination). The telecommunications service provider's network and equipment associated with the real time analysis system is configured to send a "reject call" message back to a telecommunication network that originally routed the call to the real time analysis system for analysis when the real time analysis system determines that the call should be blocked. In another such embodiment, if the real time analysis system determines that the analyzed call should not be blocked (i.e., should be allowed to be terminated to the intended destination), the telecommunications service provider's network and equipment associated with the real time analysis system is configured to send a "reject call" message back to a telecommunication network that originally routed the call to the real time analysis system for analysis. In other words, in one such embodiment, the telecommunications service provider's network and equipment associated with the real time analysis system is configured to send a "reject call" message regardless of whether or not the call should be blocked.

In accordance with one embodiment, the call analysis system detects potentially fraudulent calls based upon one or more factors. Some of the factors include unallocated numbers, invalid number ranges, known fraudulent A-numbers, known fraudulent B-numbers, highly repeated A-numbers, highly repeated B-numbers, high cost destinations, European out-of-region surcharge calls, customer-specific requirements, etc.

While in one embodiment, the real time analysis system can be implemented in a telecommunications network (PSTN or VoIP), the invention is applicable to call analysis in any network over which calls are routed.

It should also be appreciated that the real time analysis system for communications data is not limited to call analysis. For example, the real time analysis system can be applied to other forms of communications, such as messaging or any other suitable form of communications. Certain messaging embodiments are described in more detail below.

BRIEF DESCRIPTION OF THE DRAWINGS

The following drawings illustrate examples of various components of the invention disclosed herein, and are for illustrative purposes only.

DETAILED DESCRIPTION OF THE INVENTION

The fields of Internet based communication and telephony have proven to be a viable technology and are evolving at an ever-increasing rate. It is now common to use any type of end point such as a telephone terminal, handset, cell phone, computer, smart phone, etc. to initiate or receive a voice call either over the traditional public switched telephone network (PSTN) or the Internet using Voice over Internet Protocol (VoIP). A call may be "terminated" (i.e., completed to an appropriate destination, in telephony parlance) by connecting one end point to either the Internet or PSTN, which in turn accesses at least one or more gateways to ultimately terminate the call to another endpoint. The terminated call may travel through the PSTN, the Internet, and even over private networks (or any combination of the foregoing) to reach the call's ultimate destination. The end points and networks may also be frequently used for exchanging asynchronous communications, such as messaging.

The PSTN is a circuit switched network. That is, the PSTN assigns a dedicated communication line or resource to a user with which to complete the telephone call, and the user can utilize the assigned resource of the PSTN in any chosen manner. It is understood that the user is paying for the use of the dedicated resource of the PSTN. While the circuit switched approach of the PSTN system is not necessarily the most efficient system in terms of call traffic, it is relatively easy to ensure that information destined for a particular user is delivered.

The Internet is a packet switched network in which communication is accomplished by breaking transmitted data into "packets" and interleaving the packets to best utilize the bandwidth available at any given time on the Internet. When the packets reach their intended destination, they must be reassembled into the originally transmitted data. Loss of packets, and thus data, occurs frequently in such a network, and the ability of the network to successfully transmit information from one point in the network to another determines the quality of the network.

A system of gateways located at various endpoints on the Internet can facilitate VoIP telephony by permitting the gateways to act as protocol bridges between the PSTN and the Internet. A VoIP service provider may operate a VoIP network which can route/terminate a VoIP call that traverses both PSTN networks and packet switched networks like the Internet. The originator of a call may use a standard telephone connected to a first PSTN to dial a telephone number of another person on a second PSTN. A trunk line of the first PSTN connects to an originator gateway (telephony switch or server) that connects the first PSTN to a packet switched network, such as the Internet. The initiator gateway may send its position in the network along with the telephone number of the call recipient (within the second PSTN) to a route server, which determines which of many other gateways should be used to complete the call to the telephone number in the second PSTN and transmits this information to the initiator gateway. A call connection is then established between the originator gateway and a terminator gateway serving the second PSTN, which may involve routing the call through several intermediate servers on the Internet. The terminator gateway completes the call to the called party by connecting to the second PSTN.

The connection of a call between users on PSTNs is just provided as an example. Those skilled in the art will appreciate that the users need not necessarily communicate via a PSTN. In general, a call will be considered as originating with a caller of one telephony service provider and being destined to a call recipient (regardless of the type of connection to the customer or the recipient).

The telephony service provider typically generates revenue, at least in part, by buying and reselling call completion services (also known as termination services). That is, when an originator gateway in the United States, for example, needs to complete a call to Luxembourg, for example, the originator gateway will send that call through a particular terminating gateway that can terminate the call to an end point at the final destination in Luxembourg. The telephony service provider associated with the originating gateway will pay the terminating gateway operator a fee, for example, fifty cents per minute, for such termination services. In one embodiment, if a VoIP service provider provides call termination services to the originating gateway (e.g., sits in the call path between originating service provider and the termination service provider and routes the call to the terminating gateway in Luxembourg), the VoIP service provider may charge the originating service provider (associated with the originator gateway) fifty-five cents per minute for such termination services to Luxembourg. The five-cent difference in this example is the VoIP service provider's profit.

Further details of techniques used in furtherance of the foregoing are described in commonly owned U.S. Pat. No. 6,404,864, ("the '864 patent") assigned to the same assignee as the present application. The disclosure of the '864 patent is hereby incorporated by reference in its entirety. Other suitable mechanisms may be used to route and terminate calls over the PSTN and the Internet.

The above business model is viable in large part due to the fact that the various carriers that operate around the world often do not have individual contractual relationships with each other. Without such relationships, it is difficult to terminate calls to every location in the world. A VoIP service provider may perform, in a loose sense, a matching service that matches those seeking to send calls to specific destinations, with those seeking to earn money by terminating (completing) such calls in those destinations. The contractual relationships required however, are typically between the various carriers that operate the originating and terminating gateways, and the VoIP service provider.

Take for example, a VoIP service provider contracts for termination services with a particular terminating gateway operator. An operator of an originating gateway also contracts with the VoIP service provider to send/terminate call traffic to appropriate destinations for the operator of the originating gateway. If the originating gateway sends the VoIP service provider a call to terminate with the terminating gateway, but the operator of the originating gateway does not pay the VoIP service provider for such call termination services, the VoIP service provider will still be contractually bound to pay the terminating gateway operator for terminating the call. This potentially results in a loss of revenue for the VoIP service provider. This often happens in the case of fraud or hacking. For example, if someone hacks into the local network connected to an originating gateway, the hacker can cause the originating gateway to send fraudulent calls to the VoIP service provider. The VoIP service provider may send the fraudulent calls to a terminating gateway operator to terminate (e.g., complete) the fraudulent calls. The operator of the originating gateway may not pay for those calls, while the VoIP service provider may have contracted with the terminating gateway operator to pay for calls that the terminating gateway operator terminates to a destination (including fraudulent calls). Hence, a loss of revenue to the VoIP service provider may result.

Further, an originating gateway operator may be a small carrier without a sophisticated security system. It is thus often possible for a malicious source to breach a system and relay malicious traffic to the VoIP service provider, which appears to be legitimate customer traffic, without the customer (i.e., the originating gateway operator) even being aware. The VoIP service provider is ultimately responsible to remunerate the downstream service providers, and often the defrauded customer is too small to assume the financial losses, or is not contractually or legally responsible. It should be appreciated that the VoIP service provider could be any suitable telecommunication service provider that routes or terminates calls.

One more serious problem is that the fraudulent traffic may not be discovered until days or weeks later, when call detail records ("CDR") show an unusually high amount of traffic and unusually high charges to a specific destination, for example. Another problem is that the fraud that results in loss to the VoIP service provider is often fraud committed against one of the carriers' networks, not directly against the VoIP service provider. Hence, it is difficult for the VoIP service provider to manage the fraud, even though the resulting loss may largely be borne by the VoIP service provider.

The VoIP service provider must play a delicate balancing act between catching enough fraudulent call traffic and allowing legitimate call traffic to be terminated. For example, allowing legitimate traffic from to flow between customers and destinations even when the call volume increases. And even being exposed to significant financial losses if the VoIP service provider does not properly and quickly react to situations that do, in fact, involve fraudulent traffic from trusted customers.

The VoIP service provider may also desire to sell real time fraud monitoring service to other telecom carriers without terminating a call for such other carriers. The VoIP service provider may also desire to sell a real time fraud monitoring services to other telecom carriers by utilizing existing telecommunications infrastructure equipment.

Figure 1:
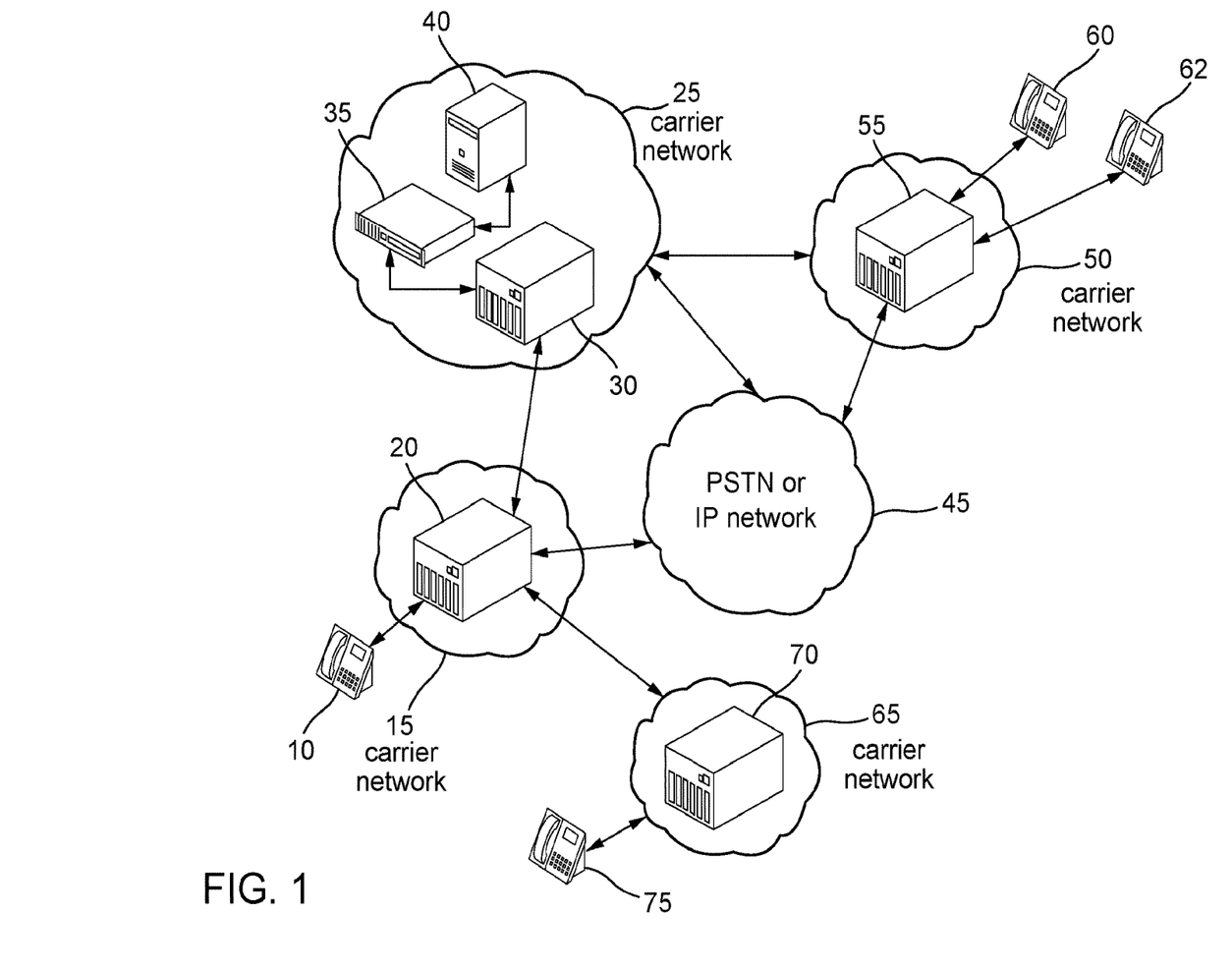
FIG. 1 is a diagrammatic view of one embodiment of a network system adapted to analyze communication data in real time.

FIG. 1 is a diagrammatic view of one embodiment of a network system adapted to perform real time analysis of voice calls and to minimize fraudulent calls.

End point 10 is a device that enables a user to transmit and receive data, such as making and receiving telephone calls. End point 10 may include a telephone terminal, handset, cell phone, computer, smart phone, etc. Other suitable devices are described below. End point 10 is in communication with at least carrier network 15. Carrier network 15 may be a PSTN or an IP network that enables end point 10 to make and receive calls. Carrier network 15 includes at least one network element 20 that can transmit and receive telephone calls from devices such as end point 10 and other network elements (from within the carrier network 15 or outside of carrier network 15). In some embodiments, carrier network 15 may include any number of network elements necessary to operate a carrier network. Network element 20 may be a telephony switch or telephony gateway or other suitable network device or server (as is further described below). Network element 20 may be configured to transmit and receive telephone calls over either the PSTN or an IP network (e.g., for VoIP calls), or both. As shown in FIG. 1, carrier network 15 may be in communication with many other networks such as carrier network 25, carrier network 65, network 45, and carrier network 50. It should be appreciated that carrier network 15 may communicate with any suitable number of other networks and devices.

In one embodiment, carrier network 25 includes several network elements. Carrier network 25 includes at least one network element 30 that can transmit and receive telephone calls. In some embodiments, carrier network 25 may include any number of network elements necessary to operate a carrier network. Network element 30 may be a telephony switch or telephony gateway or other suitable network device or server (as is further described below). Network element 30 may be configured to transmit and receive telephone calls over either the PSTN (e.g., for TDM calls) or an IP network (e.g., for VoIP calls), or both. Network element 30 may include an SMS or MMS server or other messaging service that permits end points (e.g., 10, 60, 62, 75) to communicate with asynchronous communications. Network element 30 may be a stand alone messaging server. Where multiple network elements 30 are present in carrier network 15, network elements 30 may be any suitable combinations of telephony or messaging switches, gateways, servers, etc. As shown in FIG. 1, carrier network 25 may be in communication with many other networks such as carrier network 15, carrier network 50, and network 45. It should be appreciated that carrier network 25 may communicate with any suitable number of other networks and devices. While not shown, carrier network 25 may be configured to communicate with any number of end points (e.g., to receive or terminal calls to these end points).

In one embodiment carrier network 25 further includes a routing system. The routing system may include specially programmed servers or network elements such as network element 35 and network element 40. The specially programmed network elements 35 and 40 may perform operations such as network policy and routing management. Network elements 35 and 40 may perform decision analysis for network policy and route management such as toll-free routing, least-cost routing, number portability, voice VPN, SIP trunking, centralized dial plans, emergency services, etc. In some embodiments (not shown), the routing system may divide the work of network policy and route management over more than two network elements. Alternatively, in some embodiments (not shown), the routing system may rely on one network element to perform such operations.

In one embodiment, network 45 may be a PSTN network. In an alternative embodiment, network 45 may be an IP network such as the Internet. As shown in FIG. 1, network 45 is in communication with carrier network 15, carrier network 25, carrier network 50. However, it should be appreciated that network 45 may be in communication with any suitable number of networks.

Carrier network 50 may be a PSTN or an IP network that enables end points to make and receive calls. Carrier network 50 includes at least one network element 55 that can transmit and receive telephone calls from end points and other network elements (from within the carrier network 50 or outside of carrier network 50). In some embodiments, carrier network 50 may include any number of network elements necessary to operate a carrier network. Network element 55 may be a telephony switch or telephony gateway or other suitable network device or server (as is further described below). Network element 55 may be configured to transmit and receive telephone calls over either the PSTN (e.g., for TDM calls) or an IP network (e.g., for VoIP calls), or both. As shown in FIG. 1, carrier network 50 may be in communication with many other networks such as carrier network 25, and network 45. It should be appreciated that carrier network 50 may communicate with any suitable number of other networks and devices. As shown in FIG. 1, carrier network 50 is in communication with at least end point 60 and end point 62. End points 60 and 62 are devices that enables a user to transmit and receive data, such as making and receiving telephone calls. End points 60 and 62 may include a telephone terminal, handset, cell phone, computer, smart phone, etc. Other suitable devices are described below for end points 60 and 62.

Carrier network 65 may be a PSTN or an IP network that enables end points to make and receive calls. Carrier network 65 includes at least one network element 70 that can transmit and receive telephone calls from end points and other network elements (from within the carrier network 65 or outside of carrier network 65). In some embodiments, carrier network 65 may include any number of network elements necessary to operate a carrier network. Network element 70 may be a telephony switch or telephony gateway or other suitable network device or server (as is further described below). Network element 70 may be configured to transmit and receive telephone calls over either the PSTN (e.g., for TDM calls) or an IP network (e.g., for VoIP calls), or both. As shown in FIG. 1, carrier network 65 may be in communication with many other networks such as carrier network 15. It should be appreciated that carrier network 65 may communicate with any suitable number of other networks and devices. As shown in FIG. 1, carrier network 65 is in communication with at least end point 75. End point 75 is a device that enables a user to transmit and receive data, such as making and receiving telephone calls. End point 75 may include a telephone terminal, handset, cell phone, computer, smart phone, etc. Other suitable devices are described below for end point 75.

One embodiment of an operation of the real time analysis system is disclosed below. End point 60 makes a call to end point 10. In this embodiment, end point 60 is in communication with carrier network 50. Thus, carrier network 50 handles the call from end point 60. The call may be handled by network element 55. As part of the call setup request, network element 55 receives at least end point 60's information (e.g., an A-number) as well as the end point 10 or the called party's number (e.g., a B-number). In one embodiment, network element 55 is a telephony switch that determines that end point 60 is attempting to place a call to end point 10. In an alternative embodiment, network element 55 works with other network elements in carrier network 50 to determine how and where to route the call to end point 10. Based on the B-number associated with end point 10, network element 55 determines that the best path for the call is through network 45 to carrier network 15 (where end point 10 is located). Network element 55 routes the call through network 45 and terminates the call with carrier network 15. Network element 20 may handle incoming calls from network 45. Network element 20 may determine where to next route the call to reach end point 10. In one such embodiment using the real time analysis system, network element 20 determines that carrier network 25 should receive the call.

In one embodiment network element 20 does not realize that carrier network 25 is not in the typical call termination path and may only be in the call termination path for fraud analysis. That is, in one such embodiment, carrier network 25 is not used to actually route the call to a different carrier network for termination. In one embodiment, carrier network 25 will always send the call back to carrier network 15 for termination whether to an end point on the network of carrier network 15 or to another carrier network. In one embodiment, network element 30 receives the call for carrier network 25. In one embodiment, where network element 30 relies on a routing system (e.g., network elements 35 and 40) to make determinations about how to route a call, network element 30 may route the call to network element 35 for processing. Network element 35 may analyze the call and determine that the call was routed from carrier network 15. Network element 35 may be configured to further route the call to network element 40 for further analysis.

In one embodiment, network element 40 may be specially programmed or configured to store and maintain a blacklist of known problematic attributes associated with a phone call. For example, the blacklist may cause network element to analyze the call to determine if the phone number (e.g., the A-number) associated with end point 60 is an unallocated number, from invalid number ranges, known fraudulent A-numbers, highly repeated A-numbers, high cost destinations, European out-of-region surcharge area, customer-specific requirements, etc. Any single one of these factors may be used alone in any suitable combination to determine potential fraud.

Similarly, network element 40 may be specially programmed or configured to use its blacklist to analyze the phone number (e.g., the B-number) associated with the destination of end point 10 for similar problems. For example, the blacklist may cause network element 40 to analyze the call to determine if the phone number (e.g., the B-number) associated with end point 10 is an unallocated number, an invalid number range, known fraudulent B-numbers, highly repeated B-numbers, high cost destinations, European out-of-region surcharge, customer-specific requirements, etc. Any single one of these factors may be used alone in any suitable combination to determine potential fraud.

In one embodiment, if network element 40 analyzes the call and at least one call attribute can be matched against the blacklist, the network element 40 flags the call as a potentially fraudulent call. For example, if the calling party (end point 60) is calling from a high cost destination, network element 40 flags the call as a potentially fraudulent call. In one embodiment, after network element 40 flags the call as potentially fraudulent, network element 40 further analyzes the call and the call attributes against a stored and maintained whitelist. If network element 40 determines that nothing stored in the whitelist provides a reason to remove the flag on the call from end point 60, network element 40 determines that the call from end point 60 should be blocked. Network element 40 may transmit a rejection message to network element 35. Network element 35 may transmit the rejection message to network element 30. Network element 30 may generate and transmit a rejection message to network element 20 of carrier network 15. The rejection message may be in the form of a standard Session Initiation Protocol (SIP) rejection message used between telephony switches. The SIP message may be in a predefined format that carrier network 15 and carrier network 25 agreed upon to indicate that a fraudulent call was suspected. It should be appreciated that the SIP rejection message may be in a form that would not normally convey to the recipient telephony switch that the call was rejected for suspected fraud. It should also be appreciated that the rejection message may be in the form of rejection "cause codes" for ITU or SS7 compliant systems. In either case, if network element 20 received a rejection message from network element 30 where the rejection message typically indicated that the B-number associated with the call could not be found, carrier network 15 may determine that such a rejection message from network element 30 means that carrier network 25 rejected the call due to suspected fraud. Upon receiving such a rejection from carrier network 25, carrier network 15 may block the call and send a message back to carrier network 50 indicating that the call could not be completed.

In one embodiment, carrier network 15 may determine that calls from end point 60 destined for end point 10 are not fraudulent. For example, end point 60 may be associated with a satellite office of a company associated with end point 10. Thus, despite the concern about the call from end point 60 originating from a high cost destination, the call should be completed. Carrier network 15 may transmit a message to network element 40 (or the network element performing the real time analysis in carrier network 25) to indicate that the whitelist should include an entry for calls originating from end point 60 and destined for end point 10 and should not be flagged as fraudulent. In one embodiment, if carrier network 15 provided a reason why network element 40 should include end point 60 on the whitelist, network element 40 may modify the whitelist to add additional entries based on applying a similar rational to other similar calls. For example, network element 40 may identify that the phone number associated with end point 60 is associated with a block of phone numbers assigned to the same company. Thus, network element 40 may update its whitelist automatically such that calls from the identified block of phone numbers destined for end point 10 should not be blocked in the future. It should be appreciated if network element 40 is provided reasons for modifying the whitelist, network element 40 may be configured to apply these reasons to other calls to prevent other future calls from being improperly blocked. These improperly blocked calls are considered false positives.

In another embodiment, network element 40 may not receive any reason why end point 60 should be included on the whitelist. Carrier network 15 may transmit a message to network element 40 (or the network element performing the real time analysis in carrier network 25) to indicate that the call originating from end point 60 and destined for end point 10 should not have been flagged as fraudulent. In one embodiment, network element 40 may store the message from carrier network 15, but not take further action. If another end point 62 on carrier network 50 attempts to call end point 10, network element 40 may again determine that such a call should be flagged as fraudulent and blocked for the same or similar reasons as the call from end point 60 to end point 10 was blocked. Carrier network 15 may transmit a message to network element 40 to indicate that that the call originating from end point 62 and destined for end point 10 should not have been flagged as fraudulent. In one embodiment, network element 40 may store the message from carrier network 15, but not take further action.

In one embodiment, based on receiving messages indicating that calls from end points 60 and 62 to end point 10 were not fraudulent, network element 40 may compare attributes between the calls from end point 60 and 62 to determine if there is a common attribute that is a subset of the blacklist attribute associated with the first call (the call from end point 60) and the second call (the call from end point 62). For example, if the blacklist attribute associated with the calls from end points 60 and 62 is that both calls originate from a high cost destination (determined by examining, for instance, the country code associated with phone numbers of both end points), network element 40 may examine other common subset attributes associated with both phone numbers.

In one embodiment, network element 40 may determine that both phone numbers associated with end points 60 and 62 are from the same area code (e.g., where phone numbers include a country code+an area code+a line number). As the area code is a subset of the county code in an example phone number, network element 40 may determine that the shared subset attribute of the area code combined with the message indicating that such calls should not be flagged means that calls from end points 60 and 62 to end point 10 should not be blocked. In one embodiment, network element 40 may update the whitelist to permit calls from end points 60 and 62 to end point 10 to be completed.

In another embodiment, network element 40 may determine that calls from the same area code shared by end points 60 and 62 should be added to the whitelist as a result of receiving a message that both calls should not be flagged as fraudulent (e.g., calls from the same country code and area code). In some embodiments, a network element 40 must receive a certain threshold quantity of messages indicating that calls should not be flagged where such calls also have at least one common attribute or subset attribute before network element 40 updates the whitelist to permit such calls.

It should be appreciated that any attribute commonality may be used to determine what additional whitelist changes to make to avoid improperly flagging calls in the future. For example, in another embodiment, network element 40 may determine that both phone numbers associated with end points 60 and 62 are assigned to a company that is named the same or similar to the company assigned the phone number associated with end point 10. In another embodiment, network element 40 may determine that both phone numbers associated with end points 60 and 62 are from the same block of numbers (e.g., the last 4 digits or some other suitable number of n digits of both phone numbers are from the block of phone numbers assigned to a single company).

Continuing the above example, where network element 40 has modified its whitelist to remove the flag on calls from end point 60 to end point 10. In one such embodiment, end point 60 attempts to call end point 10 again. The call is routed in the same manner as described above. However, once network element 40 determines that an entry in the whitelist provides a reason to remove the flag on the call from end point 60, network element 40 determines that the call from end point 60 should be allowed. As with the scenario where the call was flagged as potentially fraudulent, network element 40 may again transmit a rejection message to network element 35. Network element 35 may transmit the rejection message to network element 30. Network element 30 may generate and transmit a rejection message to network element 20 of carrier network 15. The rejection message may be in the form of a standard Session Initiation Protocol (SIP) rejection message used between telephony switches. However, in this embodiment, the SIP rejection message may be in a predefined format that carrier network 15 and carrier network 25 agreed upon to indicate that the call is a normal call and should not be blocked. It should be appreciated that the SIP rejection message may be in a form that would not normally convey to the recipient telephony switch that the call is normal and should be allowed. It should also be appreciated that the rejection message may be in the form of rejection "cause codes" for ITU or SS7 compliant systems. In either case, in one embodiment, if network element 20 received a rejection message from network element 30 where the rejection message indicated that the call was rejected because no circuits were available or the service was unavailable, carrier network 15 may determine that such a rejection message from network element 30 actually means that carrier network 25 determined that the call should be allowed to proceed/terminated to the intended destination. Upon receiving such a rejection from carrier network 25, carrier network 20 may terminate/route the call to the intended destination of end point 10. Thus, end point 60 and end point 10 would be allowed to hold a voice call.

It should be appreciated that when calls are routed to the real time analysis system for analysis, in one embodiment, all such calls result in a rejection of the call by the carrier network associated with the real time analysis system regardless of whether the call should be completed or the call is flagged as potentially fraudulent. Whereas, in a typical call routing scenario, if a carrier network is in a call path, the carrier network would normally attempt to route/terminate a call. By utilizing the rejection messages (rejection "cause codes" for ITU or SS7 compliant system or SIP rejections for IP based networks) for both normal and suspected fraudulent calls, the real time analysis system is specially programmed or configured to interact with standard telephony equipment and can be inserted into any call path for analysis without requiring the real time analysis system to actually route the call to completion (and incur call termination/completion costs). This is advantageous for a telephony carrier network (e.g., carrier network 15, 50, 65, etc.) that wishes to use the real time analysis of another party, but does not wish to use the other carrier network associated with the real time analysis system (e.g., carrier network 25) to terminate/complete calls. This is also advantageous to the carrier network associated with the real time analysis system because the such a carrier network can provide a new service without requiring customers to incur extra expenses to interoperate with a previously unavailable real time analysis system.

Similar to the embodiments described above, in another example embodiment, carrier network 15 may utilize the real time analysis system of carrier network 25 to analyze whether to complete calls coming from carrier network 65 (such as from end point 75) to end point 60 (or some other destination on carrier network 50). The same blacklist and whitelist analysis could be performed for the call. Carrier network 25 may issue the same call rejection messages to carrier network 15 (which may indicate either that carrier network 15 should terminate the call or block the call) regardless of whether carrier network 25 will route or terminate the call to carrier network 50 for carrier network 15 (which carrier network 25 could if requested, as shown in FIG. 1). It should be appreciated that carrier network 50, 65, and any other communications provider (not shown) may use the real time analysis system.

It should be appreciated that a carrier network providing the real time analysis system may also route/terminate calls that have been analyzed by the real time analysis system. In one such embodiment, the system to reject all calls transmitted to carrier network 25 for real time fraud is still employed. Once carrier network 25 provides the appropriate rejection notice as discussed above, then the carrier network receiving the rejection may decide to send the analyzed call back to carrier network 25 for termination. It should also be appreciated that the above analysis can be applied to other forms of electronic communication, such as, but not limited to the messaging scenarios discussed herein.

Figure 2:
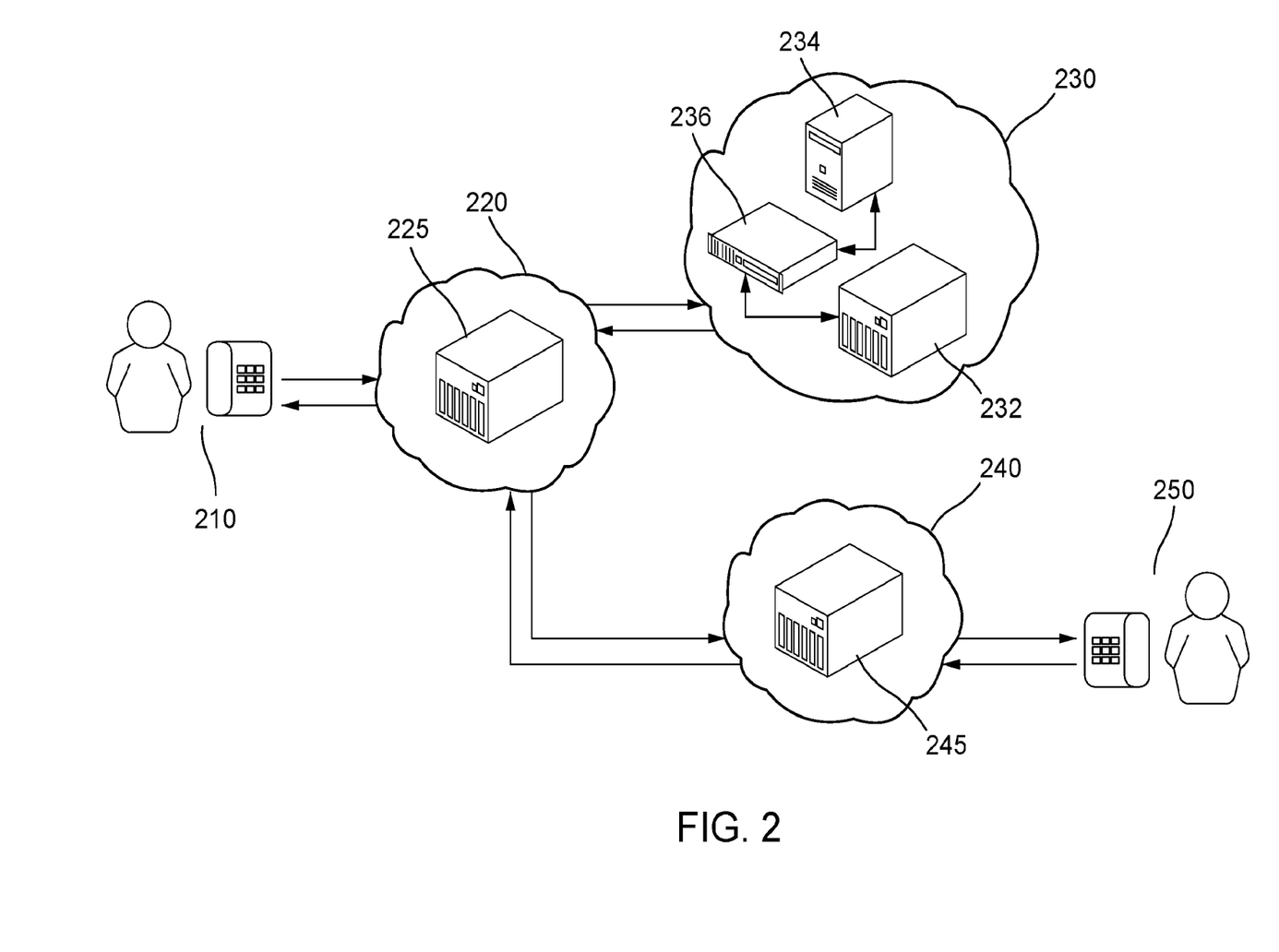
FIG. 2. is a diagrammatic view of one embodiment of a network system adapted to analyze communication data in real time.

FIG. 2. is a diagrammatic view of one embodiment of a network system adapted to analyze communication data in real time.

End point 210 is a device that enables a user to transmit and receive communications data, such as making and receiving telephone calls, sending and receiving messages, holding interactive multimedia conference calls, or some combination of the forgoing. End point 210 may include a telephone terminal, handset, cell phone, computer, smart phone, etc. Other suitable devices are described below. End point 210 is in communication with at least carrier network 220. Carrier network 220 may be a PSTN or an IP network that enables end point 210 to make and receive calls, send and receive messages, or other forms of communication. Carrier network 220 includes at least one network element 225 that can transmit and receive communications from devices such as end point 210 and other network elements (from within the carrier network 220 or outside of carrier network 220). In some embodiments, carrier network 220 may include any number of network elements necessary to operate a carrier network. Network element 225 may be a telephony switch or telephony gateway or other suitable network device or server (as is further described below). Network element 225 may be configured to transmit and receive telephone calls or messages (e.g., short message service (SMS), multimedia messaging service (MMS) messages) over either the PSTN or an IP network, or both. As shown in FIG. 2, carrier network 220 may be in communication with many other networks such as network 230 and network 240. It should be appreciated that carrier network 220 may communicate with any suitable number of other networks and devices.

In one embodiment, network 230 includes several network elements. Network 230 includes at least one network element 232 that can transmit and receive telephone calls. In some embodiments, network 230 may include any number of network elements 232 and other network elements necessary to operate a carrier network. Network element 232 may be a telephony switch or telephony gateway or other suitable network device or server (as is further described below). Network element 232 may be configured to transmit and receive telephone calls over either the PSTN (e.g., for TDM calls) or an IP network (e.g., for VoIP calls), or both. Network element 232 may include an SMS or MMS server or other messaging service that permits end points (e.g., 210, 250, etc.) to communicate with synchronous or asynchronous communications. Network element 232 may be a stand-alone messaging server. Where multiple network elements 232 are present in network 230, network elements 232 may be any suitable combinations of telephony or messaging switches, gateways, servers, etc. As shown in FIG. 2, network 230 may be in communication with another network such as carrier network 220. It should be appreciated that network 230 may communicate with any suitable number of other networks and devices (not shown). While also not shown, network 230 may also be configured to communication with any number of end points (e.g., to receive or terminate calls or send and receive messages to and from these end points).

In one embodiment carrier network 230 further includes a routing system. The routing system may include specially programmed servers or network elements such as network element 236 and network element 234. The specially programmed network elements 236 and 234 may perform operations such as network policy and routing management. Network elements 236 and 234 may perform decision analysis for network policy and route management such as fraud monitoring/detection, voice call routing, toll-free routing, least-cost routing, number portability, voice VPN, SIP trunking, centralized dial plans, emergency services, SMS routing, MMS routing, etc. In some embodiments (not shown), the routing system may divide the work of network policy and route management over more than two network elements and operate in parallel or using parallel processing. Alternatively, in some embodiments (not shown), the routing system may rely on one network element to perform all such operations, depending on the scale required to handle incoming analysis requests.

Carrier network 240 may be a PSTN or an IP network that enables end points to make and receive calls, send and receive messages, or other forms of communication. Carrier network 240 includes at least one network element 245 that can transmit and receive telephone calls from end points and other network elements (from within the carrier network 50 or outside of carrier network 50). In some embodiments, carrier network 240 may include any number of network elements necessary to operate a carrier network. Network element 245 may be a telephony switch or telephony gateway or other suitable network device or server (as is further described below). Network element 245 may be configured to transmit and receive telephone calls or messages (e.g., short message service (SMS), multimedia messaging service (MMS) messages) over either the PSTN or an IP network (e.g., for VoIP calls), or both. As shown in FIG. 2, carrier network 240 may be in communication with other networks such as network 220. As shown in FIG. 2, carrier network 240 may be in communication with end points such as end point 250. End point 250 may be an end point such as described above in connection with end point 210. It should be appreciated that carrier network 240 may communicate with any suitable number of other networks and devices.

While not shown, networks 220, 230, 240 may be in communication via any suitable type of network such as a PSTN network or an IP network such as the Internet. It should also be appreciated that the limited number of networks and end points shown in FIG. 2 are merely to simplify illustration of how the real time analysis system works and in no way limit the quantity of networks and end points that can work with the real time analysis system. The number of networks and end points that can take advantage of the real time analysis system is limited only to the computing resources available relative to the quantity of specifically configured servers and connections devoted to the real time analysis.

FIGS. 3-6 below are diagrammatic views of communication signaling flows of various embodiments of the network system for real time analysis of fraudulent communications based on the system illustrated in FIG. 2. It should be appreciated that the signaling flows of FIG. 3-6 may be applied to systems that differ from that illustrated in FIG. 2. It should also be appreciated that that although the call and message routing illustrated throughout this disclosure show only a limited number of hops and networks used to complete calls and other communications data transmissions between end points, it should be appreciated that additional hops, networks, etc. may be used between communicating end points, whether for calls or message transmissions.

Figure 3:
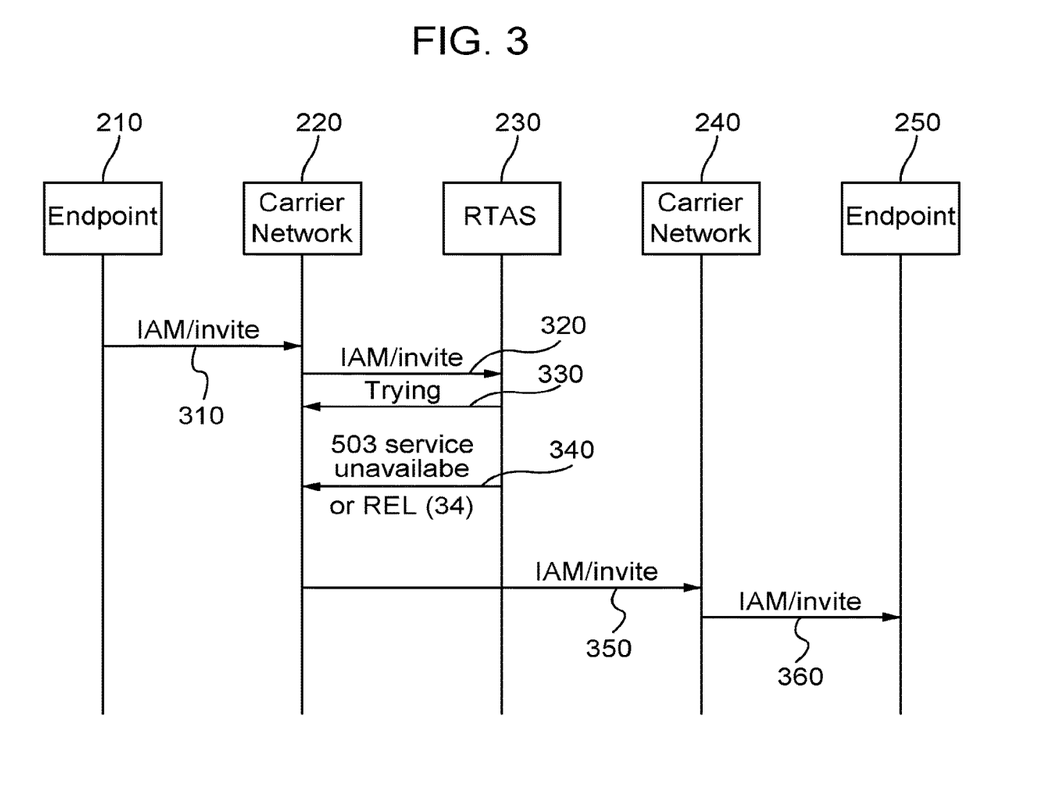
FIG. 3 is a diagrammatic view of a call signaling flow of one embodiment of a network system that rejects a call while still allowing the call to be completed to its intended destination.

FIG. 3 is a diagrammatic view of a call signaling flow of one embodiment of a network system that rejects a call while still allowing the call to be completed to its intended destination. A legitimate caller associated with end point 210 attempts to make a call to a callee associated with end point 250. To initiate the call, the end point 210 sends an IAM or an Invite message 310 to carrier network 220. The type of message depends on the type of network and equipment used by the callee at end point 210 and carrier network 220. The message 310 may be received at a network element 225 of carrier network 220. Upon receiving the message 310, carrier network 220 may be configured to send a message 320 (routing the call setup signaling) to network 230 (hereinafter referred to as the real time analysis system 230 or RTAS 230) for fraud detection processing by the RTAS 230. The RTAS 230 may send a message 330 to carrier network 220. The message 330 may include a trying message that indicates an acknowledgment of receipt of message 320.

Upon receipt of the message 320, the RTAS 230 may also perform real time analysis on the message 320, as discussed above, to determine whether or not fraud is detected in connection with the call from end point 210. In this embodiment, RTAS 230 determined that the call from end point 210 was not fraudulent (using the methods described above). Even though the RTAS 230 determined that the call from end point 210 was not fraudulent or associated with fraud, RTAS 230 sends a call rejection message 340 back to carrier network 220. The call rejection message 340 may be in the form of a 503 service unavailable message (for SIP based calls), a REL (34) message (for an SS7 based call), or some other suitable rejection message. Upon receiving the rejection message 340 from RTAS 230, carrier network 220 determines that the rejection message is associated with a determination that the call from end point 210 is not fraudulent and should be terminated (e.g., completed) to the intended destination. Carrier network 220 determines the next appropriate hop or route to send the call from end point 210. In the embodiment illustrated in FIG. 3, carrier network 220 determines carrier network 240 is the destination network where end point 250 is located. Thus, carrier network 220 sends a call setup signaling message 350 to carrier network 240. The message 350 may include an IAM or Invite message. When carrier network 240 receives the message 350, carrier network 240 may send message 360 to end point 250. The message 360 may include an IAM or Invite message.

The flow diagram of FIG. 3 does not show the remainder of the call setup signaling, media transmission between end point 210 and end point 250, and the call teardown. However, these aspects follow the standards used for SS7 and VoIP systems and should be apparent to one of ordinary skill in the art.

It should also be appreciated that the rejection message 340 from the RTAS 230 may prevent the call from being routed back to the RTAS 230 once the carrier network 220 determines that the rejection message 340 means the call should be completed. However, it should also be appreciated that in some alternative embodiments, the RTAS 230 may be used to route the call from end point 210 to the next appropriate hop in a call route to the end point 250. That is, after sending the rejection message 340, in some embodiments, carrier network 220 may route the call setup signaling back to RTAS 230 for termination/completion.

Figure 4:
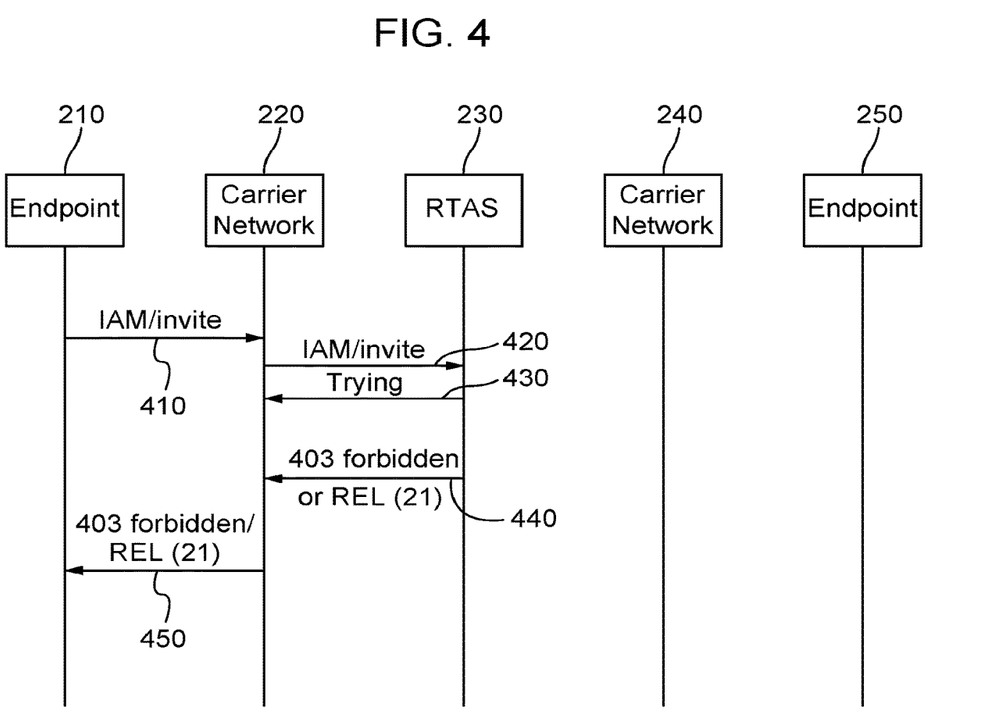
FIG. 4 is a diagrammatic view of a call signaling flow of one embodiment of a network system that rejects a call and blocks the call from being completed to its intended destination.

FIG. 4 is a diagrammatic view of a call signaling flow of one embodiment of a network system that rejects a call and blocks the call from being completed to its intended destination. An illegitimate caller associated with end point 210 attempts to make a call to a callee associated with end point 250. To initiate the call, the end point 210 sends an IAM or an Invite message 410 to carrier network 220. The type of message depends on the type of network and equipment used by the callee at end point 210 and carrier network 220. The message 410 may be received at a network element 225 of carrier network 220.

Upon receiving the message 410, carrier network 220 may be configured to send a message 420 (routing the call setup signaling) to RTAS 230 for fraud detection processing. The RTAS 230 may send a message 430 to carrier network 220. The message 430 may include a trying message that indicates an acknowledgment of receipt of message 420. Upon receipt of the message 420, the RTAS 230 may also perform real time analysis on the message 420, as discussed above, to determine whether or not fraud is detected in connection with the call from end point 210. In this embodiment, RTAS 230 determined that the call from end point 210 is fraudulent or potentially fraudulent (using the methods described above). Because the RTAS 230 determined that the call from end point 210 is fraudulent or associated with fraud, RTAS 230 sends a call rejection message 440 back to carrier network 220. The call rejection message 440 may be in the form of a 403 service unavailable message (for SIP based calls), a REL (21) message (for an SS7 based call), or some other suitable rejection message. Upon receiving the rejection message 440 from RTAS 230, carrier network 220 determines that the rejection message is actually associated with a determination that the call from end point 210 is fraudulent and should be blocked. Carrier network 220 sends a message 450 back to end point 210 to end the call.

The message 450 may be in the form of a 403 service unavailable message (for SIP based calls), a REL (21) message (for an SS7 based call), or some other suitable rejection message.

The flow diagram of FIG. 4 does not show all of the call setup and tear down signaling between end point 210 and end point 250. However, these aspects follow the standards used for SS7 and VoIP systems and should be apparent to one of ordinary skill in the art.

Figure 5:
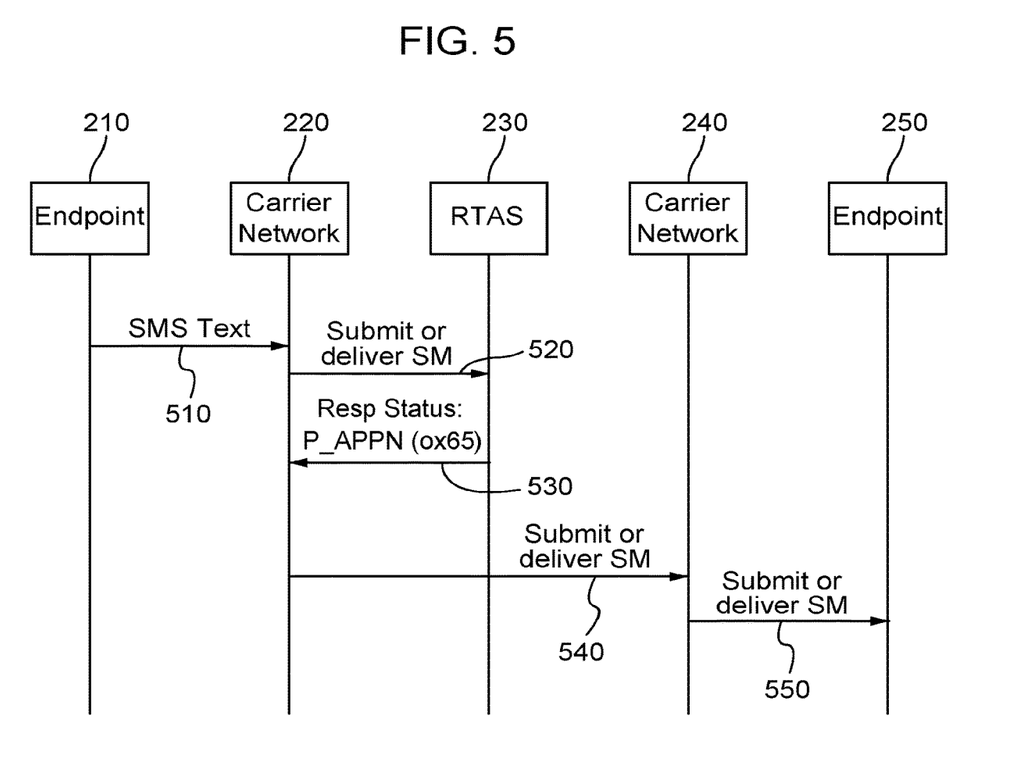
FIG. 5 is a diagrammatic view of a message signaling flow of one embodiment of a network system that rejects a message while still allowing the message to be sent to its intended destination.

FIG. 5 is a diagrammatic view of a message signaling flow of one embodiment of a network system that rejects a message while still allowing the message to be sent to its intended destination. A legitimate message sender associated with end point 210 attempts to send a message to a recipient associated with end point 250. To initiate the message transmission, the end point 210 send a message 510 to carrier network 220. The type of message depends on the type of message, network, and equipment used by the callee at end point 210 and carrier network 220. The message 510 may be in the form of an SMS, MMS, or other suitable message. The message 510 may be received at a network element 225 of carrier network 220. Upon receiving the message 510, carrier network 220 may be configured to send a message 520 to RTAS 230 for fraud detection processing by the real time analysis system. The message 520 may include a Submit or Deliver SM message.

Upon receipt of the message 520, the RTAS 230 may perform real time analysis on the message 520, as discussed above (e.g., apply an analysis of attributes associated with the message similar analyzing the attributes associated with a call), to determine whether or not fraud is detected in connection with the message from end point 210. In this embodiment, RTAS 230 determined that the message from end point 210 was not fraudulent (using the methods described above). Even though the RTAS 230 determined that the message from end point 210 was not fraudulent or associated with fraud, RTAS 230 send a rejection message 530 back to carrier network 220. The rejection message 530 may be in the form of a Resp Status: P_APPN (0x65) or some other suitable rejection message. Upon receiving the rejection message 530 from RTAS 230, carrier network 220 determines that the rejection message is actually associated with a determination that the message from end point 210 is not fraudulent and should be sent to the intended destination. Carrier network 220 determines the next appropriate hop or route to send the message from end point 210. In the embodiment illustrated in FIG. 5, carrier network 220 determines carrier network 240 is the destination network where end point 250 is located. Thus, carrier network 220 sends a message 540 to carrier network 240. The message 540 may include a Submit or Deliver SM message. When carrier network 240 receives the message 540, carrier network 240 may send message 550 to end point 250. The message 540 may include a Submit or Deliver SM message.

The flow diagram of FIG. 5 does not show all of the message transmissions between end point 210 and end point 250. However, these aspects follow the standards used for message transmission based on the type of messaging system used and should be apparent to one of ordinary skill in the art.

It should also be appreciated that the rejection message 530 from the RTAS 230 may prevent the message from being routed back to the RTAS 230 once the carrier network 220 determines that the rejection message 530 means the message should be completed. However, it should also be appreciated that in some alternative embodiments, the RTAS 230 may be used to route the message from end point 210 to the next appropriate hop in a message route to the end point 250. That is, after sending the rejection message 530, in some embodiments, carrier network 220 may route the message transmission back to RTAS 230 for further routing/completion.

Figure 6:
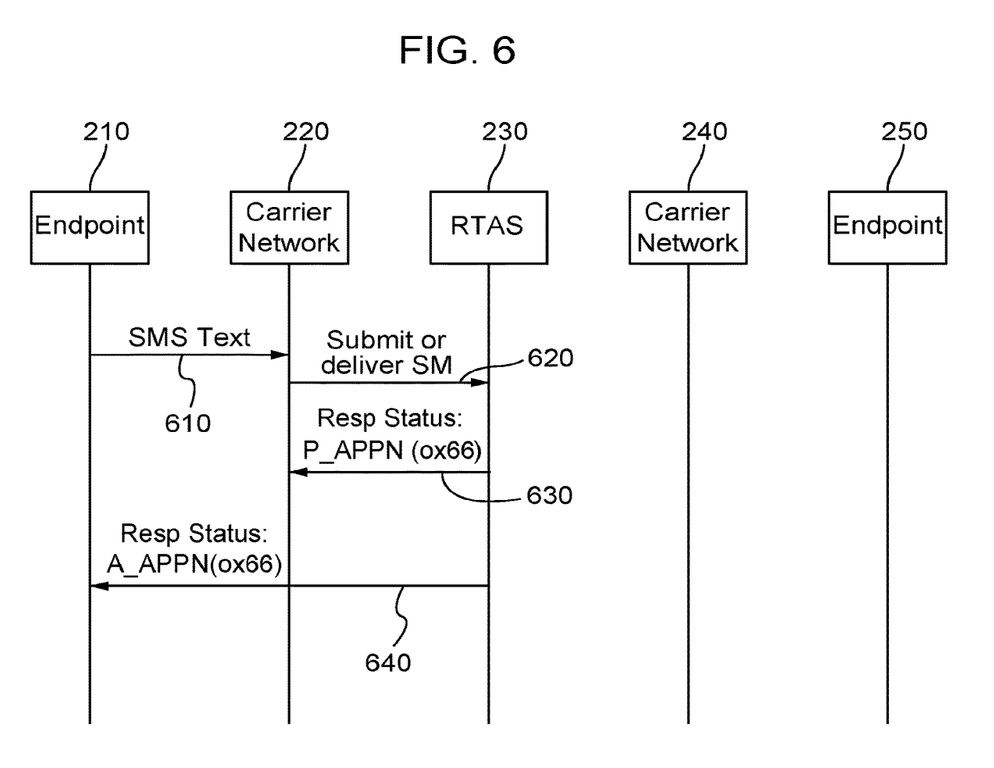
FIG. 6 is a diagrammatic view of a message signaling flow of one embodiment of a network system that rejects a message and blocks the message from being sent to its intended destination.

FIG. 6 is a diagrammatic view of a message signaling flow of one embodiment of a network system that rejects a message and blocks the message from being sent to its intended destination. An illegitimate message sender associated with end point 210 attempts to send a message to a recipient associated with end point 250. To initiate the message transmission, the end point 210 sends a message 610 to carrier network 220. The type of message depends on the type of message, network, and equipment used by the callee at end point 210 and carrier network 220. The message 610 may be in the form of an SMS, MMS, or other suitable message. The message 610 may be received at a network element 225 of carrier network 220. Upon receiving the message 610, carrier network 220 may be configured to send a message 620 to RTAS 230 for fraud detection processing by the real time analysis system. The message 620 may include a Submit or Deliver SM message.

Upon receipt of the message 620, the RTAS 230 may perform real time analysis on the message 620, as discussed above, to determine whether or not fraud is detected in connection with the message from end point 210. In this embodiment, RTAS 230 determined that the message 620 from end point 210 is fraudulent (using the methods described above). Because the RTAS 230 determined that the message from end point 210 is fraudulent or associated with fraud, RTAS 230 sends a rejection message 630 back to carrier network 220. The rejection message 630 may be in the form of a Resp Status: P_APPN (0x66) or some other suitable rejection message. Upon receiving the rejection message 630 from RTAS 230, carrier network 220 determines that the rejection message is actually associated with a determination that the message from end point 210 is fraudulent and should be blocked from being sent to the intended destination. Thus, carrier network 220 sends a rejection message 640 to end point 210. The rejection message 640 may be in the form of a Resp Status: P_APPN (0x66) or some other suitable rejection message.

The flow diagram of FIG. 6 does not show all of the message transmissions between end point 210 and the other network elements. However, these aspects follow the standards used for message transmission based on the type of messaging system used and should be apparent to one of ordinary skill in the art.

Using the architecture described herein to perform real time analysis on communication data transmissions results in technological improvements over existing systems for a cheaper, more efficient, and more secure system.

The above described real time analysis system (RTAS) architecture is cheaper than preexisting systems for several reasons. One reason is that the RTAS architecture saves network operators from high costs associated with paying for transmitting fraudulent communications data traffic. As noted above, network operators generally must pay other network operators to send communications traffic to networks and end points run by the other network operators. If fraudulent communications data traffic is sent to another network to reach the intended destination of the communications traffic, the sending network may be required to pay for the communications data traffic whether it was legitimate or not. Under preexisting systems, communications traffic was reviewed after the communications were already completed. Data identifying that particular communications traffic was fraudulent was not detected until weeks or months after the fraudulent communications traffic was sent to another network and the costs for the fraudulent traffic were already incurred. This is because it was not previously possible to analyze communications data traffic in real time before the communications traffic was provided to the intended destination. Preexisting systems to detect fraud in communications data traffic analyzed records created after communications data reached their intended destination. For example, when a call is made and completed, a call data record (CDR) is generated. Network operators would use the millions of CDR records to prepare invoices and audit billing/invoicing records. Analysis of the CDR records were also used to detect and determine whether call traffic was fraudulent. On the other hand, using the RTAS architecture enables the communications data traffic to be analyzed for fraud in real time before the communications data traffic is sent to its intended destination. The RTAS architecture prevents network operators from incurring costs associated with fraudulent communications data traffic by blocking the traffic before the communications data traffic is sent to the intended destination. Blocking fraudulent communications traffic in real time also creates a more secure communications system.

Another reason that the RTAS architecture is cheaper and more efficient than preexisting systems is that network operators create less records of communications traffic. When communications data traffic is sent (and completed) to the intended destination, records of the communication are generated and stored. These records may be used, as noted above, for billing/invoicing and auditing purposes. When fraudulent traffic is blocked, less records of the communication data traffic are generated because there is less communications data traffic. Communications data results in extremely large quantities of records. By reducing the amount of records generated, less system server resources are used to create the records and less server and memory resources are used to store the records. Moreover, when the quantity of records are reduced, this also reduces the amount of analysis that must be performed on the generated records. A reduction in the amount of analysis required results in less processor and memory intensive operations. A reduction in the amount of analysis required also results fewer disputes with other network operators over fees owed for communications data traffic passed to the other network operators to handle.

Another reason that the RTAS architecture is cheaper and more efficient than preexisting systems is that less network resources are used when fraudulent communications data traffic is blocked in real time. For example, if a fraudulent communications data is sent to an intended destination, many different system resources are used on one or more networks to deliver the communication data. Many communication devices will be used to transmit the communications data, which requires unnecessary use of processors, memory, and power. Physical ports of the telecommunication devices and network bandwidth are also used to unnecessarily deliver the communications data. All of the above are generally limited resources. When these limited resources are heavily used, network operators are forced to add additional capacity in terms of additional communications devices and bandwidth. If the network operators do not add additional resources in a timely manner, the existing communication devices may drop portions of the communications data or cause the communication devices to even fail. The RTAS architecture prevents unnecessary use of limited resources and prevents the need to purchase additional resources to meet a false demand generated by fraudulent communications data traffic.

Yet another reason that the RTAS architecture is cheaper and more efficient than preexisting systems is that network operators using the RTAS system (or communications networks such as telephony carriers) do not need to purchase new hardware to use the RTAS for fraud detection. The RTAS architecture discussed herein works with existing communications and telephony systems to leverage/recycle certain communications or telecom principals and processes for new purposes. The RTAS architecture allows the fraud detection to be placed in the path of a communications transmission and analyze the communications transmission for fraud before the communications transmission incurs substantial costs. Specifically, the RTAS architecture uses and repurposes rejection messages to communicate a determination of fraud or no fraud, whether or not a communications transmission is determined to be fraudulent.

Accordingly, using the RTAS architecture described herein to perform real time analysis on communication data transmissions results in technological improvements over existing systems for a cheaper, more efficient, and more secure system.

Figure 7:
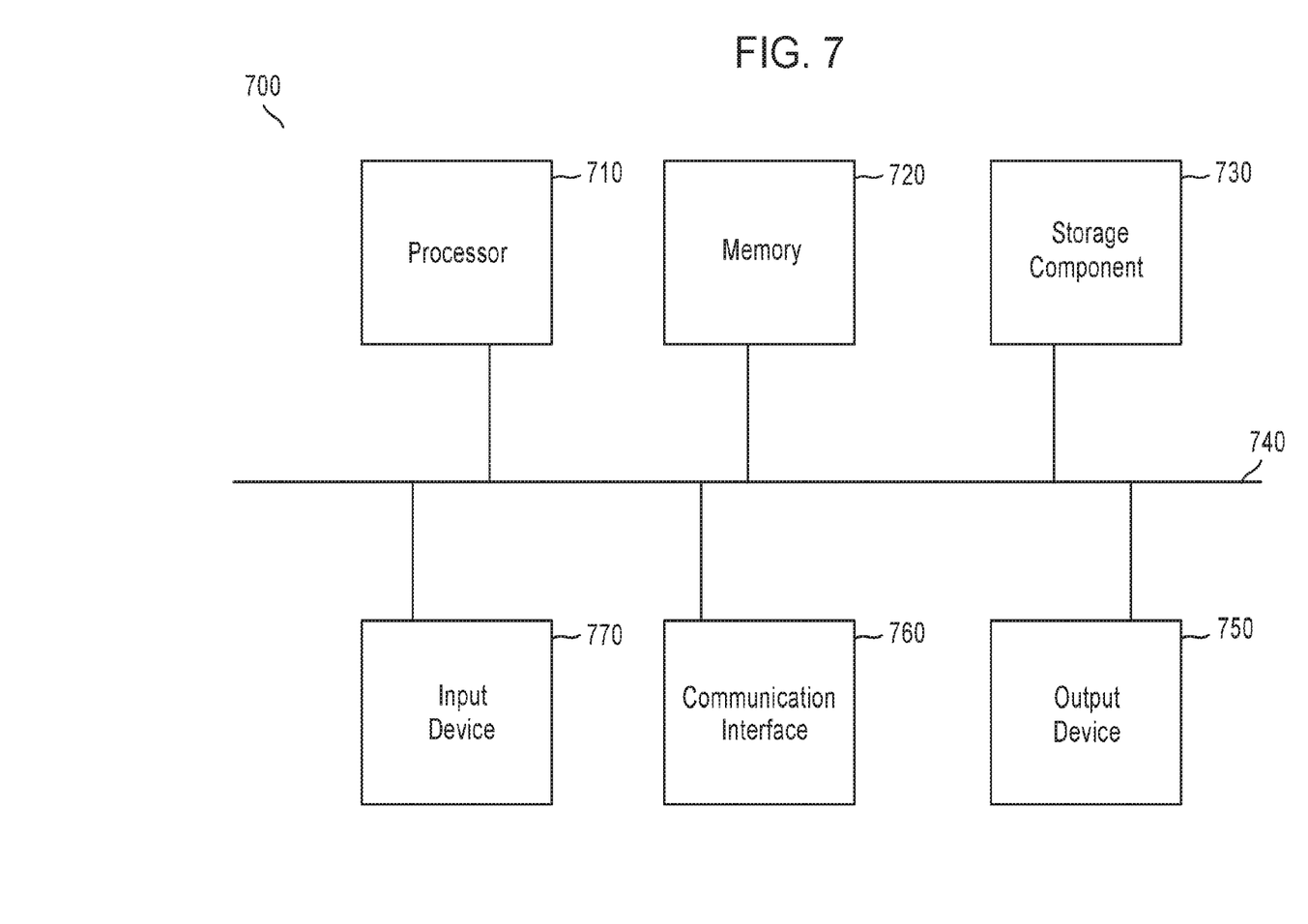
FIG. 7 is a diagram of example components of computing devices of a network system adapted to analyze communications data in real time.

FIG. 7 is a diagram of example components of computing devices 700 which may be used to implement various computer devices of the network system adapted to analyze communications data in real time described herein. For example, computer devices 700 may be used to describe devices such as network elements 30, 35, 40 in carrier network 25 and network elements 232, 234, and 236 of RTAS 230 as well as other devices described herein.

Various computing devices may be used to implement the systems and methods described in this document, as either a client or as a server or plurality of servers. Computing devices are intended to represent various forms of digital computers, such as laptops, desktops, workstations, personal digital assistants, servers, blade servers, mainframes, and other appropriate computers. Other computing devices may include various forms of mobile devices, such as personal digital assistants, cellular telephones, smartphones, and other similar computing devices. The components shown here, their connections and relationships, and their functions, are meant to be examples only, and are not meant to limit embodiments of the inventions described and/or claimed in this document.

In one embodiment, a computing device used herein may include a specially configured processor 710, memory 720, a storage device 730, a high and low speed interfaces and buses 740 connecting to the memory. Each of the components of the computing devices are interconnected using various busses, and may be mounted on a common board or in other manners as appropriate. The processor can process instructions for execution within the computing device, including instructions stored in the memory or on the storage device to display graphical information for a graphic user interface on an external input/output device 850 such as a display. In other embodiments, multiple processors and/or multiple buses may be used, as appropriate, along with multiple memories and types of memory. Also, multiple computing devices may be interconnected, with each device providing portions of the necessary operations (e.g., as a server bank, a group of blade servers, or a multi-processor system).

The processor may be implemented as a chipset of chips that include separate and multiple analog and digital processors. Additionally, the processor may be implemented using any of several architectures. For example, the processor may be an x86 processor, RISC (Reduced Instruction Set Computers) processor. The processor may coordinate with the other components of the device, such as control of user interfaces, applications run by the device, and wireless communication. Multiple processors or processors with multiple cores may also be used.

The processor may communicate with a user through a control interface and display interface coupled to a display. The display may be, for example, an LED (Liquid Crystal Display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

The memory 720 may store information within the computing device. In one embodiment, the memory is a volatile memory unit or units. In another embodiment, the memory is a non-volatile memory unit or units. The memory may also be another form of computer-readable medium, such as a magnetic or optical disk.

The storage device 730 is capable of providing mass storage for the computing device. In one embodiment, the storage device may contain a computer-readable medium, such as a hard disk device, an optical disk device, or a tape device, a flash memory or other solid state memory device, or an array of devices, including devices in a storage area network or other configurations. The storage device may be anyone of the foregoing and be located remotely, such as in a cloud infrastructure. A computer program product can be tangibly embodied in an information carrier. The computer program product may also contain instructions that, when executed, perform one or more methods, such as those described above. The information carrier is a computer or machine readable medium, such as the memory 720, the storage device 730, or memory on processor 710.

The computing device may be implemented in several different forms. For example, it may be implemented as a standard server, or multiple times in a group of such servers. It may also be implemented as part of a rack server system. In addition, it may be implemented in a desktop computer or a laptop computer. Alternatively, components from the computing device may be combined with other components in a mobile device. Each of such devices may contain one or more computing devices. An entire system may be made up of multiple computing devices that communicate with each other and also may execute functions in a parallel processing environment.

The computing devices may communicate wirelessly through communication interfaces 760, which may include digital signal processing circuitry. Communication interfaces may provide for communications under various modes or protocols, such as GSM, SMS, MMS, CDMA, among others. Such communication may occur, for example, through a radio-frequency transceiver. In addition, short-range communication may occur, such as using a Bluetooth, Wi-Fi, or other such transceiver. A GPS (Global Positioning System) receiver module may provide additional navigation and location related wireless data to the computing devices.

The computing devices may communicate audibly using an audio codec, which may receive spoken information from a user and convert it to usable digital information. The audio codec may likewise generate audible sound for a user, such as through a speaker. Such sound may include sound from voice telephone calls and may include recorded sound.

Various embodiments of the systems and techniques described here can be realized in digital electronic circuitry, integrated circuitry, specially designed ASICs (application specific integrated circuits), computer hardware, firmware, and combinations thereof. These various embodiments can include embodiments that are executable and interpretable on a programmable system including at least one programmable processor, which are special purpose computers for performing the functions of the RTAS 230, coupled to receive data and instructions from, and to transmit data and instructions to, a storage system, at least one input device, and at least one output device.

To provide for interaction with a user, the systems and techniques described here can be implemented on a computer having any suitable display device for displaying information to the user and an input device 770 (e.g., a keyboard, a touchpad, touchscreen, a mouse, or a trackball) by which the user can provide input to the computer. Other kinds of devices can be used to provide for interaction with a user as well. Feedback provided to the user can be any form of sensory feedback (e.g., visual feedback, auditory feedback, or tactile feedback). Input from the user can be received in any form, including acoustic, speech, or tactile input.

The computing system can include clients and servers. A client and server are generally remote from each other and typically interact through a communication network. The relationship of client and server arises through computer programs running on the respective computers and having a client-server relationship to each other.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible. Some process steps may be executed in different order from the specific description herein based on, for example, considerations of function, purpose, conformance to standard, legacy structure, user interface design, and the like.

A number of embodiments of the invention have been described. It should be understood that various modifications may be made without departing from the spirit and scope of the invention. For example, various forms of the flows shown above may be used, with steps re-ordered, added, or removed. Also, although several embodiments of authorizing a remote terminal or mobile device have been described, it should be recognized that numerous other applications are contemplated. Accordingly, other embodiments are within the scope of the following claims.

The invention claimed is:

1. A telecommunications system comprising:
a processor; and
a memory device that stores a plurality of instructions, which when executed by the processor, causes the processor to:
receive a request from a server to route communications data, the communications data including a plurality of communications attributes;
analyze the communications data to determine if at least one of the plurality of communications attributes associated with the communications data is on a blacklist;

if at least one of the plurality of communications attributes associated with the communications data is on the blacklist, generate a first rejection message, where the first rejection message would cause the communications data to be blocked from further routing;

if none of the plurality of communications attributes associated with the communications data are on the blacklist, generate a second rejection message, where the second rejection message would cause the communications data to be blocked from further routing; and transmit the first rejection message or the second rejection message to the server;

wherein if the second rejection message is sent, then the second rejection message causes the server to route the communications data to another server to deliver the communications data, and wherein the communications data is call signaling associated with a voice call and the at least one of the plurality of communications attributes is a country code.

2. The telecommunications system of claim 1, wherein if at least one of the plurality of communications attributes associated with the communications data is on the blacklist, flag the communications data as fraudulent.

3. The telecommunications system of claim 2, wherein the processor further analyzes the flagged communications data to determine if the at least one of the plurality of communications attributes associated with the communications data is on a whitelist.

4. The telecommunications system of claim 3, wherein if the at least one of the plurality of communications attributes associated with the communications data is on the whitelist, generate the second rejection message.

5. The telecommunications system of claim 1, wherein the second rejection message is a session initiation protocol 503 service unavailable message.

6. The telecommunications system of claim 1, wherein the second rejection message is an SS7 release 34 message.

7. The telecommunications system of claim 1, wherein the first rejection message is a session initiation protocol 403 forbidden message SS7 release 34 message.

8. The telecommunications system of claim 1, wherein the first rejection message is an SS7 release 21 message.

9. A method of operating a telecommunications system comprising:

receiving, with a processor, a request from a server to route communications data, the communications data including a plurality of communications attributes;

analyzing, with the processor, the communications data to determine if at least one of the plurality of communications attributes associated with the communications data is on a blacklist;

if at least one of the plurality of communications attributes associated with the communications data is on the blacklist, generating with the processor, a first rejection message, where the first rejection message would cause the communications data to be blocked from further routing;

if none of the plurality of communications attributes associated with the communications data are on the blacklist, generating with the processor, a second rejection message, where the second rejection message would cause the communications data to be blocked from further routing; and transmitting, with the processor, the first rejection message or the second rejection message to the server;

wherein if the second rejection message is sent, then the second rejection message causes the server to route the communications data to another server to deliver the communications data, and wherein the communications data is call signaling associated with a voice call and the at least one of the plurality of communications attributes is a country code.

10. The method of claim 9, wherein if at least one of the plurality of communications attributes associated with the communications data is on the blacklist, further comprising flagging the communications data as fraudulent.

11. The method of claim 10, further comprising analyzing the flagged communications data to determine if the at least one of the plurality of communications attributes associated with the communications data is on a whitelist.

12. The method of claim 11, wherein if the at least one of the plurality of communications attributes associated with the communications data is on the whitelist, further comprising generating the second rejection message.

* * * * *